United States Patent [19]

Windisch et al.

[11] Patent Number: 4,604,564
[45] Date of Patent: * Aug. 5, 1986

[54] TEMPERATURE CONTROLLED, AUTO TIMED, VARIABLE AMPERAGE CASCADING-WATER FORMATION METHOD FOR USE WITH HIGH ANTIMONY AND MAINTENANCE FREE LEAD-ACID BATTERIES

[75] Inventors: Lawrence Windisch, Selma, Ala.; John Nees; Harry Channing, both of Wyomissing, Pa.

[73] Assignee: General Battery Corporation, Reading, Pa.

[ * ] Notice: The portion of the term of this patent subsequent to Jul. 29, 1997 has been disclaimed.

[21] Appl. No.: 101,897

[22] Filed: Dec. 10, 1979

Related U.S. Application Data

[63] Continuation of Ser. No. 910,942, May 30, 1978, Pat. No. 4,215,307, which is a continuation-in-part of Ser. No. 821,527, Aug. 3, 1977, Pat. No. 4,117,387.

[51] Int. Cl.⁴ .................... H02J 7/00; H01M 10/50
[52] U.S. Cl. .................................. 320/2; 429/120
[58] Field of Search .............. 320/2, 15, 22, 30, 35, 320/37, 39; 204/2, 1, 194; 429/62, 120, 122, 90-93

[56] References Cited

U.S. PATENT DOCUMENTS

| 647,388 | 4/1900 | Evans . | |
|---|---|---|---|
| 649,491 | 5/1900 | Sperry | 429/120 |
| 1,157,028 | 10/1915 | Noble | 320/37 X |
| 1,472,454 | 10/1923 | Benedict . | |
| 2,364,144 | 12/1944 | Hunsaker | 429/120 X |
| 2,528,266 | 10/1950 | Daily et al. | 320/15 X |
| 2,600,696 | 6/1952 | Schmidt | 134/182 |
| 3,221,394 | 12/1965 | Pitts | 211/188 X |
| 3,868,123 | 2/1975 | Berg et al. | 211/177 X |
| 4,007,315 | 2/1977 | Brinkman et al. | 429/120 X |
| 4,053,280 | 10/1977 | Salsbury | 134/135 X |
| 4,092,055 | 5/1978 | Wullenwaber | 312/45 |
| 4,117,387 | 9/1978 | Windisch et al. | 320/2 |
| 4,215,307 | 7/1980 | Windisch et al. | 320/2 |

FOREIGN PATENT DOCUMENTS

| 11515 | 2/1933 | Australia . | |
|---|---|---|---|
| 2061781 | 6/1972 | Fed. Rep. of Germany | 134/60 |

*Primary Examiner*—R. J. Hickey
*Attorney, Agent, or Firm*—Benasutti and Murray; Anthony S. Volpe

[57] ABSTRACT

A novel formation method is disclosed which is compatable for use in forming high antimony as well as, maintenance free (i.e., low antimony calcium, etc.) batteries. The method includes constant circulation of a cooling fluid around the batteries to be formed while the batteries are stepped through various charging cycles of different lengths and currents. The preferred method is a "one shot" method, thus eliminating the necessity of adding successive electrolyte solutions to the batteries. Unlike prior "one shot" formation techniques, however, formation times are relatively short while plate clearance characteristics and the completeness of formation are excellent.

9 Claims, 5 Drawing Figures

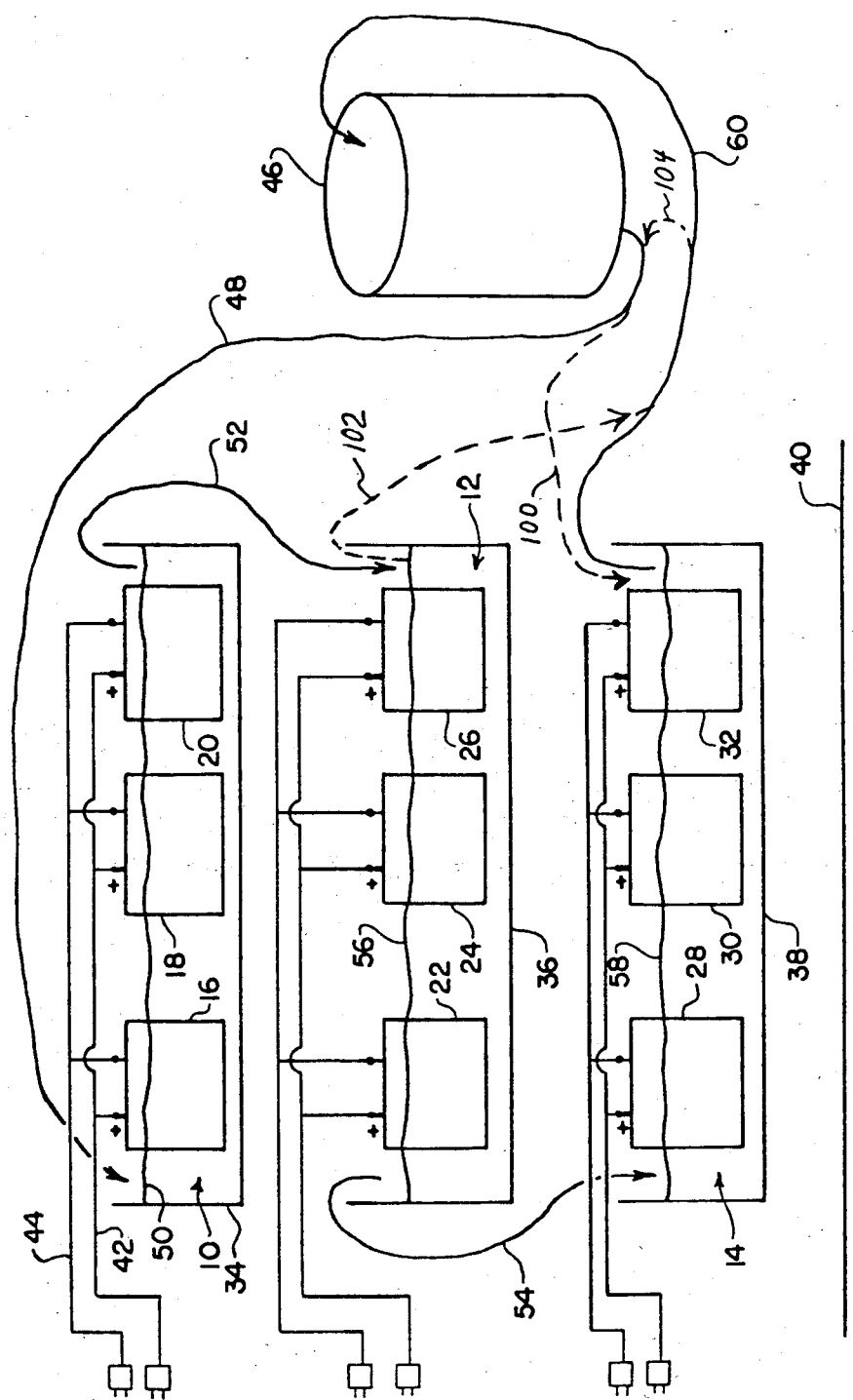

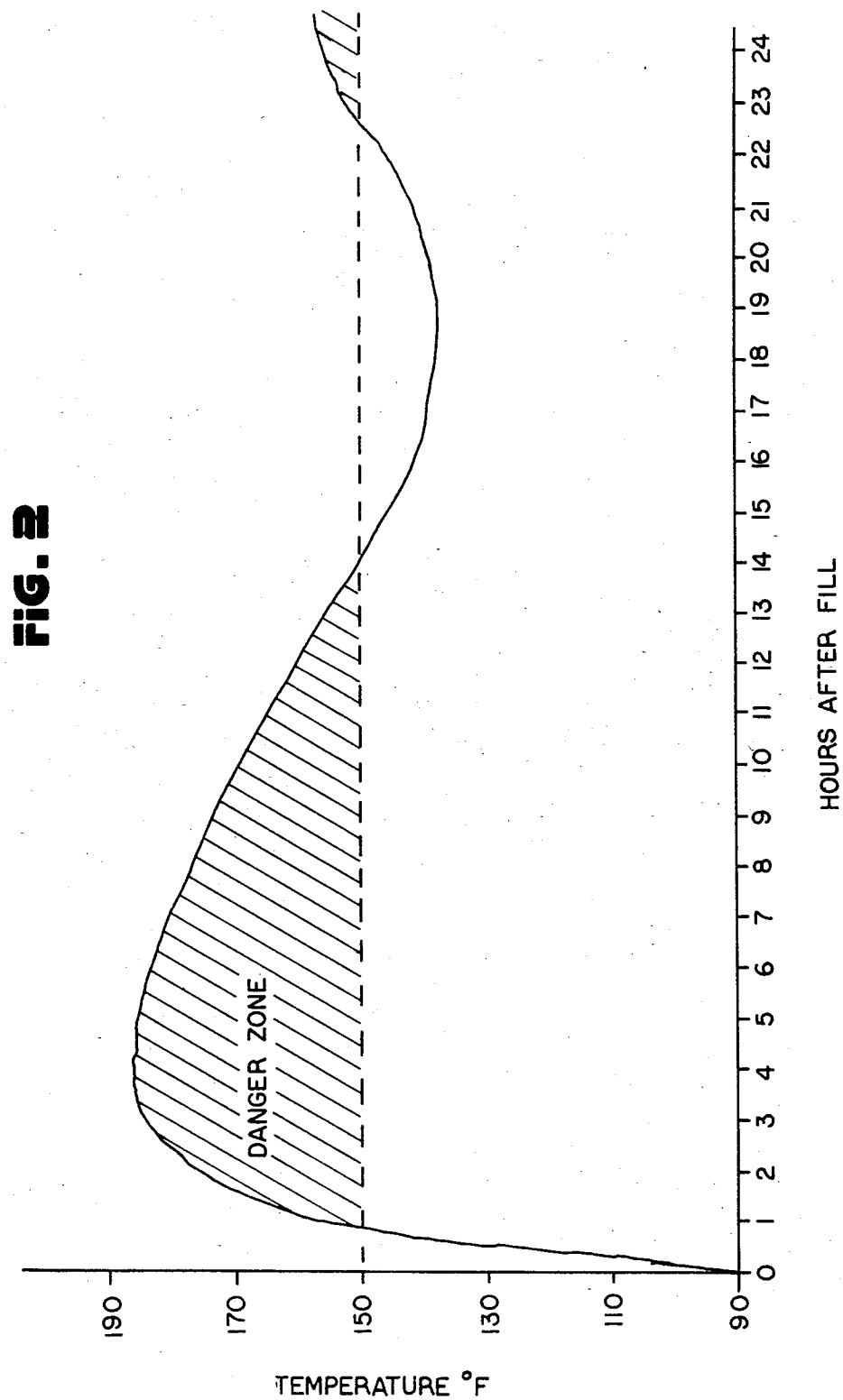

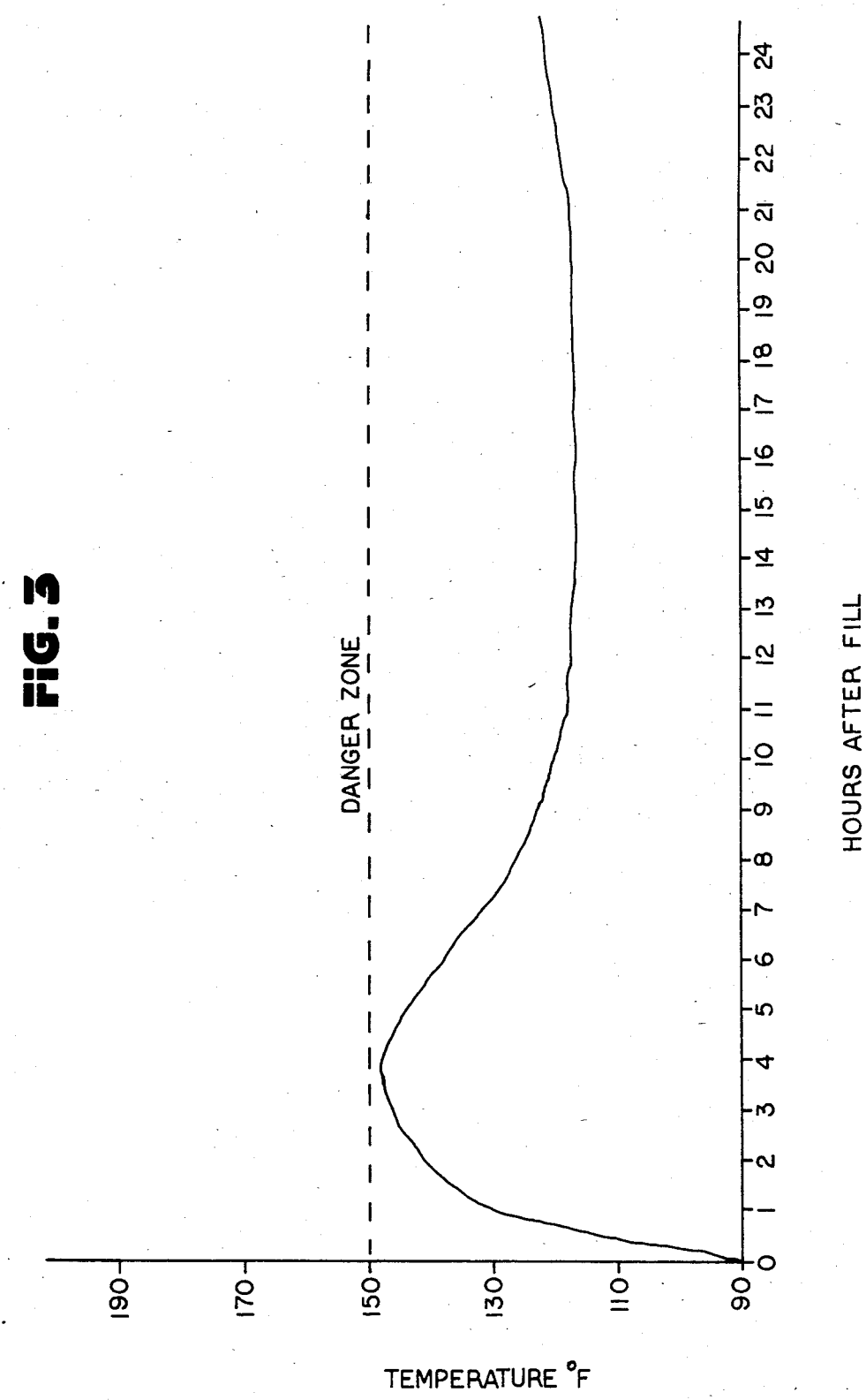

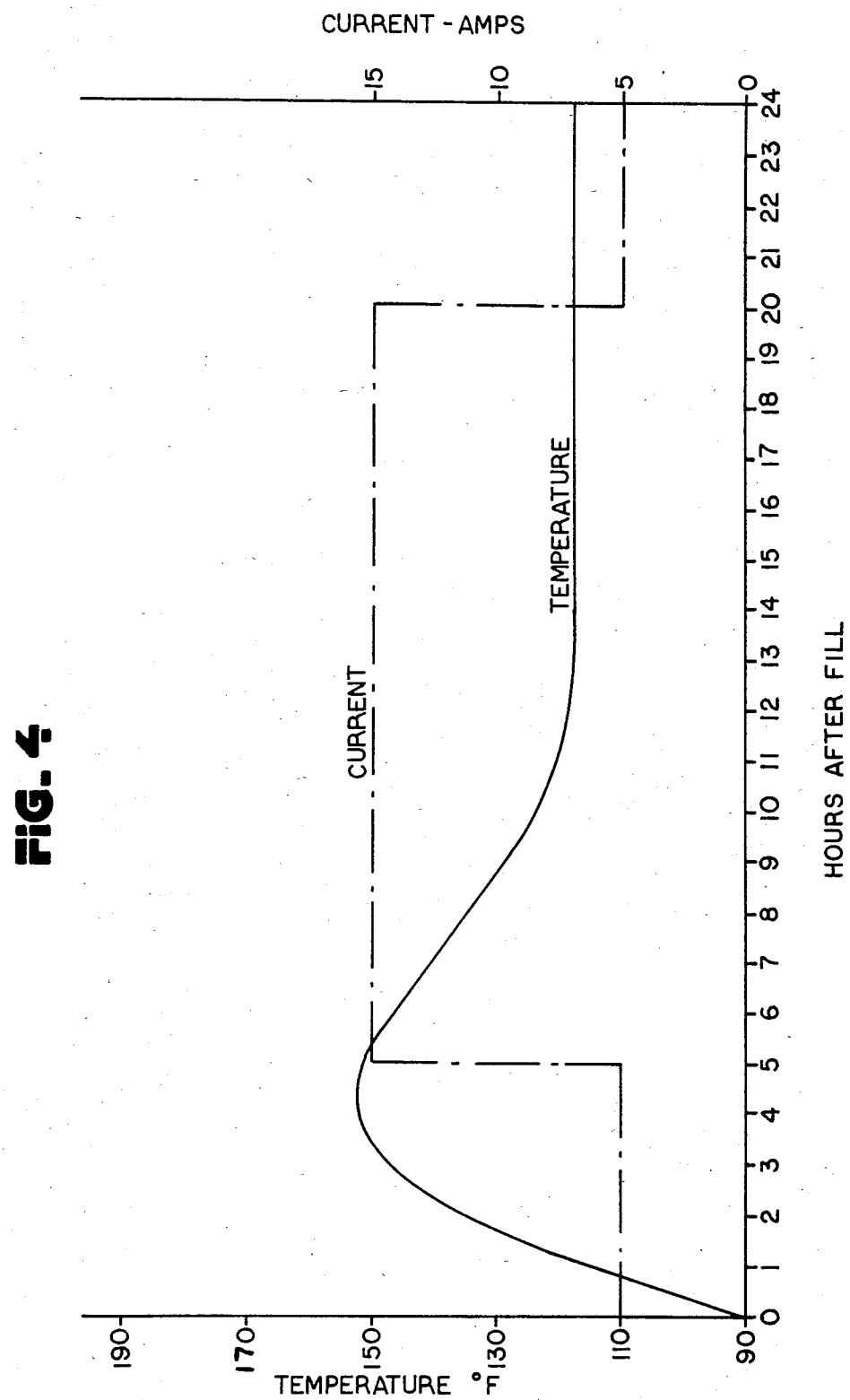

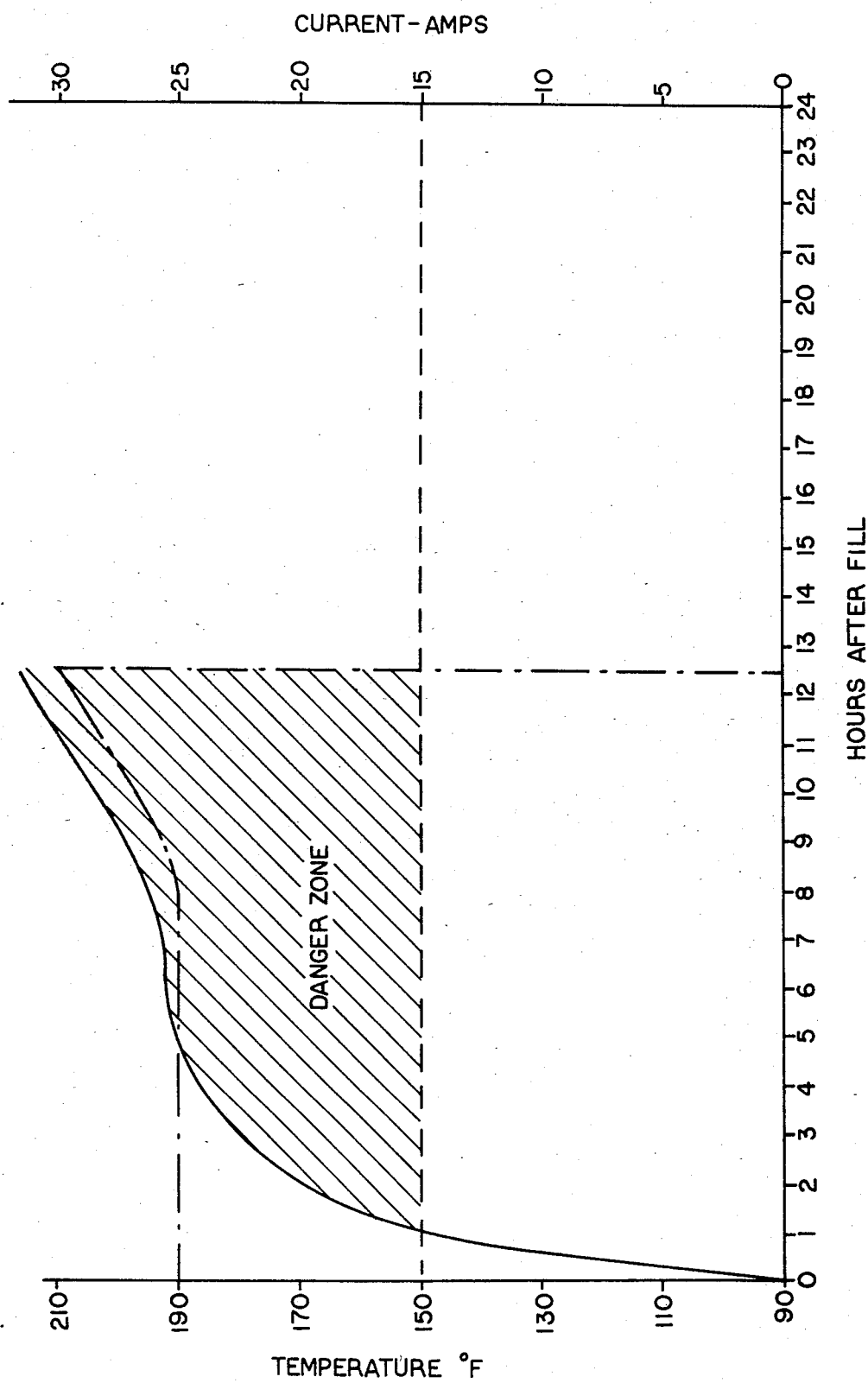

TEMPERATURE CONTROLLED, AUTO TIMED, VARIABLE AMPERAGE CASCADING-WATER FORMATION METHOD FOR USE WITH HIGH ANTIMONY AND MAINTENANCE FREE LEAD-ACID BATTERIES

CROSS-REFERENCE TO RELATED APPLICATIONS

This is a continuation of application Ser. No. 910,942 filed May 30, 1978, now U.S. Pat. No. 4,215,307, which is a continuation-in-part of my copending U.S. patent application Ser. No. 821,527, filed Aug. 3, 1977 now U.S. Pat. No. 4,117,387 entitled, "CASCADING-WATER, LEAD-ACID STORAGE BATTERY NEUTRALIZATION FORMING AND CHARGING METHOD", which application is incorporated herein by reference as if fully set forth herein.

The present application is also related to copending U.S. patent application Ser. No. 866,301 filed Jan. 3, 1978, entitled "Cascading-Water, Lead-Acid Storage Battery Neutrilization, Forming and Charging Apparatus, now abandoned.

BACKGROUND OF THE INVENTION

In a modern battery production facility, the ability to form batteries is an important aspect of that facility's ability to meet fluctuating seasonal demands for fully formed and charged batteries. Since these demands peak in the winter months, it has become commonplace for manufacturers to make an inventory "duff" (dry-unformed) batteries which are filled with electrolyte and formed immediately prior to shipment during periods of peak demand. Accordingly, the "peak load" capacity of a given battery manufacturing facility depends to some extent upon the ability of that facility to form batteries.

The advent on a significant commercial scale of "maintenance free batteries" has further added to the problem of satisfying seasonal demands, since market fluctuations which may depend to a certain extent on local weather conditions make it difficult, if not impossible, to accurately predict the percentage of a given battery plant's production which must be formed as either conventional "high-antimony" product, or, alternatively, as a "maintenance free" product.

Heretofore, most battery production facilities included rectification equipment designed to supply a constant voltage to continuously charge high-antimony batteries, which voltage was selected on the basis of the formation characteristics of those batteries. For maintenance free batteries, on the other hand, which do not tend to gas as much as high-antimony batteries, which have a higher end-of-charge voltage and which may be relatively more prone to thermal runaway, relatively higher charging voltages have been preferred to effect the electro-chemical changes which occur during formation. While these constant voltage or modified constant voltage techniques have experienced considerable success, the sharp drop in currents which accompany later stages of this process significantly retard the overall formation time, particularly with maintenance free batteries which have higher end-of charge voltages.

In many battery facilities, in order to aid in formation and counteract somewhat the effect of gassing and chemical heat produced by the addition of electrolyte to dry, unformed batteries, "two shot" formation methods have been employed wherein relatively lower specific gravity acids are first introduced into the batteries and then are replaced with relatively higher specific gravity acids near the completion of the forming process to provide a "finishing charge" to those batteries. In addition to obviating certain problems with "plate pickling" which are associated with the introduction of relatively higher gravity acids to dry unformed battery, the "two shot" process of forming batteries has usually been considered to exhibit better plate clearance characteristics and more complete conversion of battery oxides into sponge lead etc. than a "one shot" process. Accordingly, most battery manufacturers have preferred a "two shot" formation process for reasons which include (1) formation time required; (2) fewer problems with overheating and/or thermal "runaway"; and (3) the clearing characteristics obtained therewith for fully charged or nearly fully charged battery plates.

Although it has long been known to utilize a variable amperage charging method for charging and/or recharging lead acid storage batteries, variable amperage charging methods have not generally been applied by the battery industry to form storage batteries due, at least in part, to the electro-chemical complexities of such a process, particularly in view of the disparate battery capacities and types routinely formed in a normal commercial battery production facility.

Another classical formation problem in the battery industry is controlling temperature and time of battery formation. When electrolyte is first added to an unfilled, unformed battery and interacts with the paste on the plates of the element assembly within the battery, a great deal of heat is generated; this heat being referred to as the heat of neutralization. Heat continues to be generated by the battery during the formation and charging process while high current flow is presented through the batteries. It is uneconomical to purchase and maintain sufficient equipment to form batteries at a current low enough to prevent the heating of the batteries.

Various means have been devised to cool batteries during the neutralization, formation, and charging process in order to avoid internal overheating of the batteries which, if not properly controlled, results in destruction of the battery. The problem of dissipating heat which is generated during the formation of a battery has been aggravated by the widespread use of plastic battery cases throughout the automotive battery industry. Unlike rubber, composition, or glass cases previously used by the industry, plastic cases tend to have a low heat transfer coefficient which tends to insulate the interior of the battery making it particularly susceptible to overheating problems.

Several approaches, such as circulating water baths in which batteries stand in low rows of tanks permanently erected on the floor of the forming room have been used in attempts to dissipate the heat produced when using high current during the battery neutralization, formation, and charging process. While this has been successful, it is a highly restrictive technique and does not allow individual rectifying circuit control for batteries at various stages of neutralization, formation, and charging. Another method which has been used is the water spray in which the batteries are sprayed with water or cooling fluid. However this approach is not as good as the circulating bath method since the water spray does not have the heat conducting capacity of the former method. Chilled electrolyte has been used as a method of reducing the heat of neutralization. However, this is an expensive method and while it reduces the high initial peak, the possibility of high heat developing during formation exists as well as the possibility of having a delayed thermal runaway.

Due to the relatively higher volumes of batteries produced, and the plastic case designs, the various grid alloys and oxide mixtures now commonly used in the production of automotive batteries, the prior art techniques above have not proved satisfactory and relatively long formation times have therefore been necessitated to insure that overheating does not occur during formation.

SUMMARY OF THE INVENTION

Applicants' invention basically comprises a battery production method wherein sets of batteries are placed in a plurality of portable tanks or tubs; the batteries within each tub being electrically interconnected within that tub so that a minimum number of leads are required for subsequent connection to a charging circuit. The tubs are then stacked at a plurality of heights above the forming room floor and in the preferred embodiment the tubs are disposed substantially vertically above one another. Each tub of batteries is readily interchangeable with the other tubs in the various vertical positions. Cooling fluid such as water is introduced at least into the highest tub to a predetermined level above which the water overflows and may begin to fill the adjacent lower tub which in turn overflows to fill the remaining tubs until all the tubs have been filled with water and are overflowing. Cooling fluid may also be introduced into other tubs in the vertical array to maintain the cooling bath between 100° and 125° F. If necessary to keep the temperature within this temperature range, the overflow cooling fluid or water coming from the last tub at the lowest position may be conveyed to a cooling tower which removes the heat from the cooling fluid or, alternatively recycled directly without cooling. In either event at least some cooling fluid is then conveyed to the tub in the highest position.

Since each of the tubs of batteries are interchangeable in the various heights above the floor and further since the cascading action of the water described above tends to skim off and pass only the warmest portions of the coolant from one tub to the next or to the cooling tower input, it is possible to establish a flow pattern of coolant so that immediately upon its reintroduction into the system from the cooling tower, the coolant may be utilized to service batteries which are most prone to overheating or thermal runaway. For example, those batteries nearing the end of the formation process and/or which are being given a boost charge and/or which are of lower capacities and/or are constructed of certain types of grid or paste compositions, may be suitably arranged in vertical positions to receive the effluent or overflow from "primary" or higher tubs, whereby a given amount of cooling fluid and/or cooling tower capacity cools a maximum number of batteries in a minimum amount of forming room space.

Applicants' invention also includes a process whereby a lower rate of current is used to pass through the batteries immediately following the introduction of "one shot" electrolyte into unfilled, unformed batteries. This avoids unnecessary heat generation while the heat of neutralization is being reduced or accommodated, while acting as an anti-pickling charge. Following the initial stage, after a predetermined amount of time, the amount of current is increased until a second predetermined period is finished, at which time the current is again lowered during the final formation stage.

Accordingly, a primary object of the present invention is the provision of a novel method of cooling batteries with plastic cases in neutralization, forming and charging stages.

Another object of the present invention is the provision of a novel method which allows individual charging circuit control of batteries in various stages in neutralization, formation, and charging.

Another aim of the present invention is the provision of a method of producing batteries with plastic cases which have been formed under conditions of controlled temperature and time for each of the neutralization, formation, and charging processes.

Another object of the present invention is the provision of a novel method of producing batteries with plastic cases which allows the use of relatively high charging currents throughout the bulk of the formation process.

It is another aim of the present invention to provide a method of producing batteries which produces a maximum number of batteries in a minimum amount of forming room floor space.

It is another object of the present invention to provide a method of cooling batteries during the neutralization, forming, and charging states of production which allows individual charging circuit controls of batteries in various stages of production.

These and other objects of my invention will become apparent from the following description with reference to the accompanying drawings.

BRIEF DESCRIPTION OF THE DRAWINGS

FIG. 1 is a schematic of the preferred embodiment process of our invention, alternate cooling fluid pathways being shown with broken lines and arrows;

FIG. 2 is a graph showing the simulated electrolyte temperature of a sixty-five amp hour capacity during a conventional formation process, after introducing electrolyte into the battery.

FIG. 3 is a graph showing the electrolyte temperature of a sixty-five amp hour capacity battery during the cascade cooling process of our invention after filling the battery with electrolyte, using a modified constant voltage technique, where a low initial current charge is provided by connecting additional resistance across the load in the first 5 hours, followed by a constant voltage throughout the remaining formation process;

FIG. 4 is a graph of the temperature of the electrolyte of a sixty-five amp hour battery during the preferred embodiment cascade formation of our invention showing the levels of current provided to the batteries by a rectifying circuit superimposed on the graph, the lower constant final formation temperature resulting from this process being illustrated to the right of this graph;

FIG. 5 is a graph showing the temperature of electrolyte in a battery during a conventional formation process in which thermal runaway has occurred.

DESCRIPTION OF THE PREFERRED EMBODIMENT

Although specific forms of the invention have been selected for illustration in the drawings, and the following description is drawn in specific terms for the purpose of describing forms of the invention, this description is not intended to limit the scope of the invention as defined in the appended claims.

Referring to FIG. 1, the first step in the preferred process of applicants' invention is to separate a plurality of batteries into a plurality of sets, such as sets designated generally 10, 12, and 14 in FIG. 1. The set 10 comprises batteries 16, 18, and 20; the set 12 comprises batteries 22, 24, and 26; and the set 14 comprises batteries 28, 30, and 32. In the preferred process, this step is not done radomly but batteries are sorted into sets depending on the capacity, type and/or stage of formation of these batteries.

After separating the plurality of batteries into a plurality of sets such as 10, 12, and 14, the next step in applicants' preferred process is to provide a plurality of container means 34, 36, and 38 for holding a plurality of battery sets such as sets 10, 12, and 14 respectively. These sets are placed into their respective container means and electrically connected together for connection with a separate external rectifying circuit. For example, in container No. 34, the battery set 10 has the positive terminals connected together to a single power line 42 while the negative terminals are all connected to the power line 44. The power lines 42 and 44 are readily adaptable to be connected to a rectifier for forming and charging the batteries in the set 10. The remaining sets of batteries shown in FIG. 1 are each individually connected to a separate rectifying source in a similar manner. This allows individual circuit controls for each individual set of batteries in the stack of battery sets. Each of the container means with its accompanying set of batteries is then stacked at a plurality of positions at different heights above a forming room floor. In FIG. 1, container means 34 is shown above container means 36 and container means 36 is shown above container means 38. In the preferred embodiment the container means with the respective set of batteries are stacked vertically above one another.

In the preferred process of applicants' invention, the next step is to continuously provide a cooling fluid, such as water, to fill the first container means 34 with battery set 10 to a predetermined level 50, container means 34 being positioned at the greatest height above the forming floor 40. The flow of cooling fluid or water from a source of water such as cooling tower 46 is represented by the curved line and arrow 48. When the water has reached this level 50, it is allowed to overflow container 34 and enter a second lower adjacent container means such as container 36 as schematically represented by the line and arrow 52. After container means 36 fills to predetermined level 56, the water overflows to enter container means 38 (see curved line and arrow 54) whereupon container means 38 fills to predetermined level 58 after which the cooling fluid or water overflows to enter the adjacent lower container means or to flow onto the forming room floor, or, as in FIG. 1, to be conveyed to cooling tower 46 (see line and arrow 60). Cooling tower 46 or other cooling means acts to remove the heat from the water whereupon the cooling water is returned to the highest container means 34.

It will be appreciated that as the water passes through the cooling tower 46, a considerable amount of heat is removed and it is desirable that the batteries sorted into the highest container means such as container means 34 be those batteries most in need of cooling. In general, these are batteries of higher capacities or batteries which for various reasons are prone to generating more heat during the formation or charging processes. Hence, battery set 10 in container means 34 is preferably a set of unformed high-capacity batteries.

FIG. 2 is a simulated graph of the temperature of electrolyte of a sixty-five amp hour capacity battery as it undergoes a conventional "one shot" modified constant voltage formation process without using the cascading water process of applicants' invention. The ambient room temperature and temperature of the filling acid is 90° F. The abscissa is Temperature in degrees Fahrenheit and the ordinate is Hours after fill, that is, hours after filling the battery with electrolyte. In the initial five hours or so after filling the battery with electrolyte, the temperature of the electrolyte exceeds 150° F. peaking neat 190° F. which is potentially harmful to the battery. After the heat of neutralization is past, the temperature gradually decreases to below 150° F. at 14 hours past filling. Near the end of formation, between 22 and 23 hours after filling, when the back voltage of the batteries is high and the concentration of the acid is approaching 1.265 specific gravity, the temperature of the electrolyte begins to rise again into the danger zone above 150° F.

In contrast to FIG. 2, our cooling process in combination with a modified constant voltage process results in a temperature curve shown in FIG. 3; (the abscissa and ordinate being the same). During this process, 100°–125° F. cooling fluid is circulated into contact with 5 sides of the batteries. It will be noted that at no time does the temperature of the electrolyte exceed 150° F., otherwise known as the danger zone. The heat of neutralization is still present and the temperature peaks neat 150° F. after four hours after filling. However, it gradually decreases to between 100° F. and 130° F. for several hours before rising slightly near the end of formation when the back voltage is high and when, in a "one shot" process, the specific gravity approaches 1.265. The end of the formation process is critical from a temperature standpoint since separator damage is likely to result at this time even with slightly elevated i.e., 150+° F., "one shot" end-of-formation temperatures.

FIG. 4 shows the preferred way of controlling the current while continuing the flow of water during the charging process. It is a graph of temperature of electrolyte versus hours after filling as in FIGS. 2 and 3. The curve is similar to that of FIG. 3 with the current set at a first predetermined level during a first predetermined initial period, for example, 5 Amps for the first five hours. Then, after the heat of neutralization has peaked, the current is raised to a second predetermined level for a second predetermined period, for example, 15 Amps for fifteen hours. Finally, the current is lowered to a third predetermined level for a third predetermined period, for example, 5 Amps for four hours. This third adjustment in current to a lower current level helps to reduce the temperature rise in the electrolyte near the end of formation. This temperature is shown in FIGS. 2 and 3, but not in FIG. 4.

FIG. 5 demonstrates thermal runaway in a battery undergoing formation which, sometimes happens when applicants' process is not followed. A charging level current of 15 Amps is set at the beginning of the formation process and the temperature of the electrolyte increases beyond the danger level of 150° due to the heat of neutralization. Because of the accumulation of the heat of neutralization and the heat generated by the high charging level of 15 Amps, the temperature of the electrolyte does not taper off as in FIGS. 2 through 4 to come back below the danger level but continues to rise with probable destruction to the battery.

As was previously indicated, batteries at various stages of formation can be sorted into different sets. Examples of the types of sets that may be desired are unformed and unfilled batteries of maintenance free, high antimony types of various uniform capacities, batteries which are partially formed but not fully charged and batteries which require a boost charge. The amount of heat which the batteries in these different sets give off will differ. The batteries in the set of highest capacity unformed and unfilled batteries, when the electrolyte is initially added, will generate the greatest amount of heat and therefore, should be placed in a position in the vertical stack of container means which will receive the coolest water or cooling fluid. In FIG. 1 this is container means 34 and battery set 10. As the cooling fluid enters the container means 34, the warmer fluid moves gradually to the top with the cooler fluid remaining at the bottom of the container means 34 to enter the adjacent lower container means 36. Of the sets above described of batteries, batteries which are partially formed and not fully charges will generate more heat than those batteries which require only a boost charge. Hence, it is desirable to place this set of batteries as set 12 in container means 36. Again the warmest water will gradually move to the top of the tank to overflow and enter the lower adjacent tank 38. Hence, the warmest water will enter the third tank and batteries requiring the least amount of cooling should be placed in this tank. Of the battery sets described above, those requiring boost charge will generate the least amount of heat and they should be placed in the container means 38 as set 14. As described previously, the warmest water will again rise to the top, overflow tank means 38 onto the floor of the forming room or, alternatively, through a purification or neutralization system and then to a cooling tower for return to the vertical array of containing means where it will repeat the cascading process through several container means. The types of sets which might be formed from a plurality of batteries are not limited to the description of the sets given above.

The present invention also provides a novel method of utilizing a "one shot" formation technique in combination with these cooling techniques to form batteries while achieving improved formation efficiencies. According to the method of the present invention, dry, unformed batteries of similar cranking capacities may be simultaneously formed using the same rectification facilities regardless of whether those batteries are high antimony lead acid batteries or are maintenance free, i.e., low antimony or calcium lead acid batteries. According to the preferred method of the present invention, dry, unformed high antimony stock of a preselected cranking capacity and/or dry, unformed maintenance free stock of a preselected capacity are filled with a conventional relatively higher gravity "one shot" formation electrolyte and then immediately divided into preselected matrix groups. The matrix groups of high antimony lead acid batteries, preferably comprise a four by five matrix of approximately twenty batteries per group, while the maintenance free batteries are divided into preselected numbers of matrix groups of approximately sixteen–eighteen batteries, preferably in a four by four plus matrix. Each matrix should then preferably be immediately transferred into cooling tubs, one for each matrix group, each of the batteries within each matrix being spaced apart from its adjacent batteries by a distance sufficient to allow fluid to freely circulate therebetween. Once disposed in these tubs, each group is then promptly wired in series to interconnect each battery of the group, and each of the tubs should be arranged in sets of vertical arrays and the connections from each group connected to individual rectification units of a central timing/charging system. Thereafter a three phase charging process should immediately be begun. In the first phase, circulation of a cooling fluid, preferably water, which is maintained at a temperature of about 100°–125° F. should be circulated through each of the tubs. A fixed amperage "anti-pickling" charge is applied at this point, at a rate of 4 to 6, preferably 5, amps for 1–5 hours, preferably 2–3 hours, during which time the heat of neutralization is dissipated into the cooling fluid and the exothermic chemical reactions between the electrolyte and the battery plate materials will have passed a point where thermal runaway is likely to occur. The preferred electrolyte for use in this method is a conventionally, relatively higher gravity "one shot" formation electrolyte as for example, a sulphuric acid electrolyte containing 30–40 grams per liter of sodium sulphate and, having a specific gravity of between 1150 and 1220, the particular gravity to be used having been determined according to the relative capacities of the batteries to be formed.

At the completion of phase one of the charging cycle, the circulation of 100°–125° F. cooling fluid is continued, while the rate of charge is automatically shifted into a variable length charge cycle at a rate of 15–18 amps for a preselected time "y" where "y" is greater than 3.8x–86 and is less than 4.6x–24, and preferably, between 4.0x–57 and 4.5x–40, suitable complete formations having been obtained when "y" was equal to 4x minus 40, the higher values (i.e., up to 4.5x) being necessary only to compensate for capacity variations within a matrix set which results from slightly different oxide amounts etc. from battery to battery.

At the completion of phase 2 of the charging cycle, circulation of cooling fluid having temperatures between 100°–125° F. is continued while the charging system is automatically shifted to a "clearing charge" of a 4 to 8 preferably 5–7 amp rate for 5 to 7, preferably 6 hours.

As mentioned above, the preferred temperature of cooling fluid circulated around the batteries to be formed is between 100°–125° F. It would, of course, be possible particularly during the colder winter months, to chill water or other cooling fluids substantially below the preferred minimum 100° F. Applicants have found, however, that such chilling of the cooling fluid to such temperatures is not desirable, and if complete formation is to be obtained using the "one shot" formation process, it is extremely desirable to maintain the batteries to be formed in a bath which is controlled within this temperature range throughout all phases of the formation and charging process. As shown in particular in FIGS. 3 and 4, the maintenance of cooling fluid temperatures in this range insures that from at least one hour after filling through to the end of the entire formation process, the electrolyte temperatures are maintained between 110° F. and 150° F. and preferably during the later phases of the formation process stabilized between 120° and 130 ° F., and preferably about 125° F. It is theorized that rigorous control of the electrolyte temperatures of batteries undergoing a formation process enables that formation to proceed at an optimum rate, that is, by maintaining the formation electrolyte within this desired temperature range the thermodynamics of the primary and secondary reactions occurring during formation are shifted so that reaction kinetics more strongly favor complete formation of the active paste materials while shifting the reaction kinetics away from secondary reactions which may complete with the primary reaction for starting materials while producing end product complexes acting as inhibitors of the primary reaction to thereby reduce the overall yield of the primary reaction, i.e., the completeness of formation. Accordingly, as seen in particular in FIG. 1, alternate circulation pathways are provided for ensuring that the temperature of the cooling fluid is maintained within this optimum range. It may, for example, be desirable to introduce cooling fluid as for example by pathway 100 directly into a tub from which that cooling fluid is removed for return to the cooling tower 46. Alternatively, as shown via pathway 102, it may be desired to return cooling fluid to the cooling tower after it has passed through a plurality of tubs, but less than all the tubs in a vertical array. Finally, as illustrated by pathway 104, it may be desired, particularly in colder whether, to shunt some or all of the cooling fluid by the cooling tower 46 so that the cooling fluid is rapidly raised by recirculation to the desired temperature range.

Using the method of the present invention, complete formation may be obtained using relatively less current that that heretofore necessary to complete formation. Thus, considerable success has been achieved in completing the formation of, for example, a 300 amp hour battery by applying a total of approximately 1200 amp hours of formation current to that battery, instead of the heretofore industry wide acceptable standard of 4.5 times the number of amp hours of battery capacity, or 1350 amp hours for a 300 amp hour battery. This savings of approximately 8% in the total current required to charge a battery is coupled with a substantial decrease in the formation time required for that battery. While under production conditions, it is advisable to use closer to 4.5 times the amp hour of battery capacity to compensate for individual battery variations, corresponding increases in efficiency are believed to nonetheless be maintained under these conditions.

Accordingly, instead of continuously charging a battery at a constant low amperage rate for longer periods of time, shorter charging cycles charging cycle may now be established, thereby enabling a given battery production facility to run on a five day work week instad of the heretofore required seven day work week. Due to the nature of this charging technique, considerable overtime expenses have accordingly been eliminated through the use of this method.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A method for producing batteries having plastic cases comprising the steps of:
    (a) separating a plurality of batteries into a plurality of sets;
    (b) providing a plurality of container means for holding a plurality of battery sets;
    (c) placing said sets of batteries into said container means, one set for each container means and electrically interconnecting said batteries in each set for connection to a separate rectifying means for each set;
    (d) stacking said plurality of container means at a plurality of positions at different heights above a forming room floor;
    (e) connecting each set of said batteries to said separate rectifying means for charging said plurality of batteries in each set;
    (f) continuously providing cooling fluid to maintain each of said plurality of container means at a predetermined level, and to circulate said cooling fluid therethrough by causing said cooling fluid to overflow from said container means; and
    (g) forming said sets with said rectifying means while maintaining said cooling fluid within each of said container means at a temperature of between 100° to 125° F.

2. The invention of claim 1 wherein the step of maintaining said cooling fluid temperature further comprises the steps of:
    (h) conveying said overflow cooling fluid from said container means to a heat removing means for removing heat from said cooling fluid; and
    (i) returning said cooling fluid from said heat removing means to said container means.

3. The method of claim 1 wherein step (a) further comprises sorting batteries which are at a similar stage of formation into a single set.

4. The invention of claim 1 wherein at least one of said sets comprises a matrix group of 16 to 18 maintenance free batteries.

5. The invention of claim 1 wherein at least one of said sets comprises a matrix group of approximately 20 "high-antimony" batteries.

6. The invention of claim 1 wherein sets comprise sets of maintenance free and "high-antimony" batteries.

7. The invention of claim 1 wherein said step of maintaining said cooling fluid temperature comprises the selective step of sequentially introducing said fluid which overflows from at least one container means into at least one other of said container means disposed at a relatively lower stacking height above said floor.

8. The invention of claim 1 wherein said step of maintaining said cooling fluid temperature comprises the selective step of immediately returning at least a portion of said overflow to one of said container means.

9. The invention of claim 2 wherein said step of maintaining the cooling fluid temperature comprises the selective step of returning said cooling fluid simultaneously to a plurality of container means within said stack of said container means.

* * * * *